Oct. 19, 1954     E. C. HORTON     2,691,789
ELECTRIC WINDSHIELD CLEANER
Filed Oct. 27, 1952     2 Sheets-Sheet 1
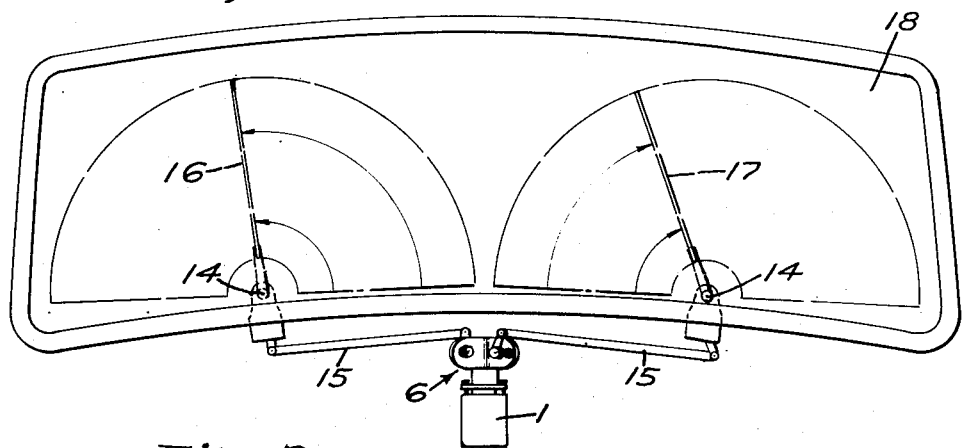
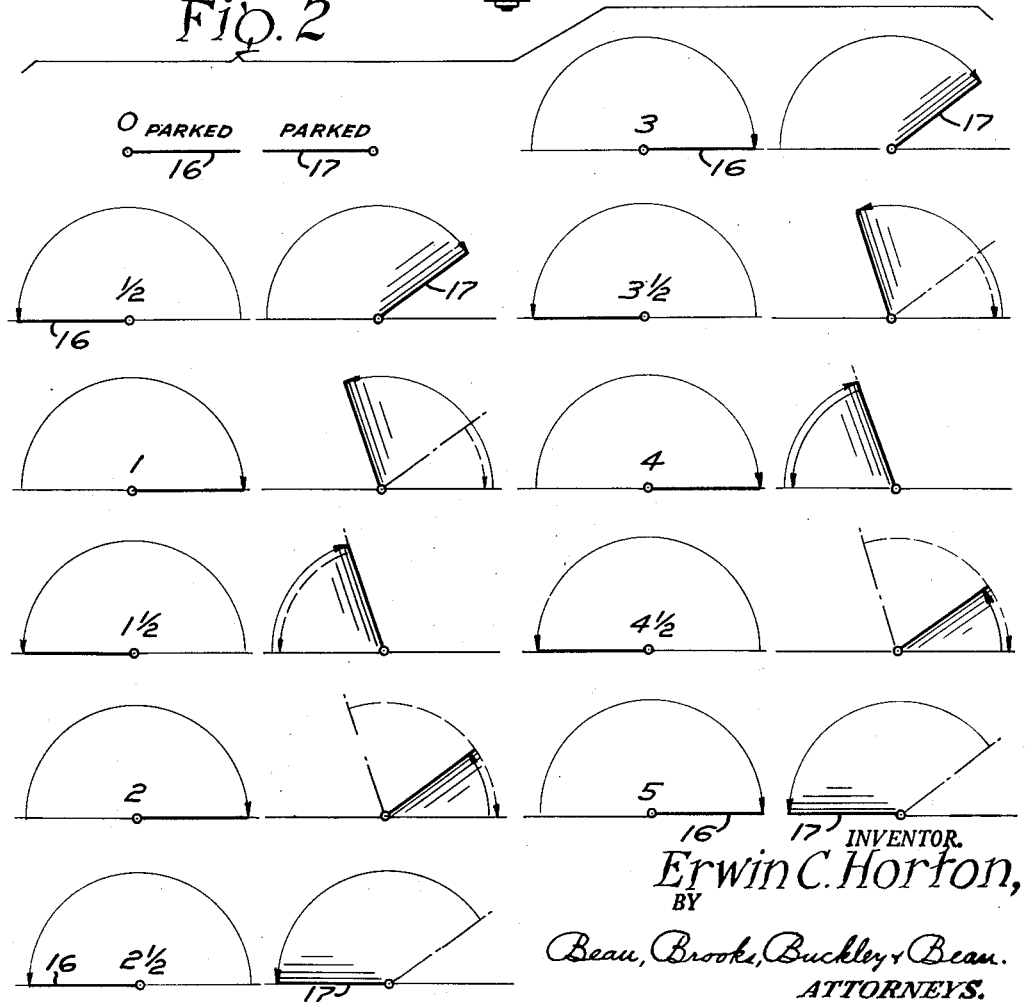
INVENTOR.
Erwin C. Horton,
BY
Beau, Brooks, Buckley & Beau.
ATTORNEYS.

Oct. 19, 1954 E. C. HORTON 2,691,789
ELECTRIC WINDSHIELD CLEANER
Filed Oct. 27, 1952 2 Sheets-Sheet 2
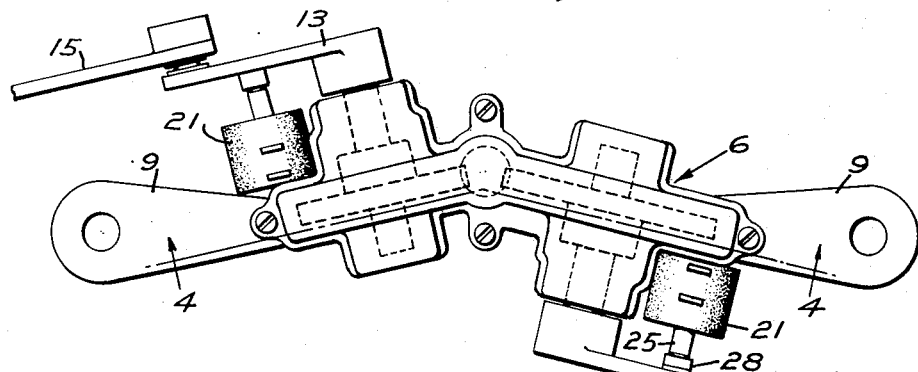
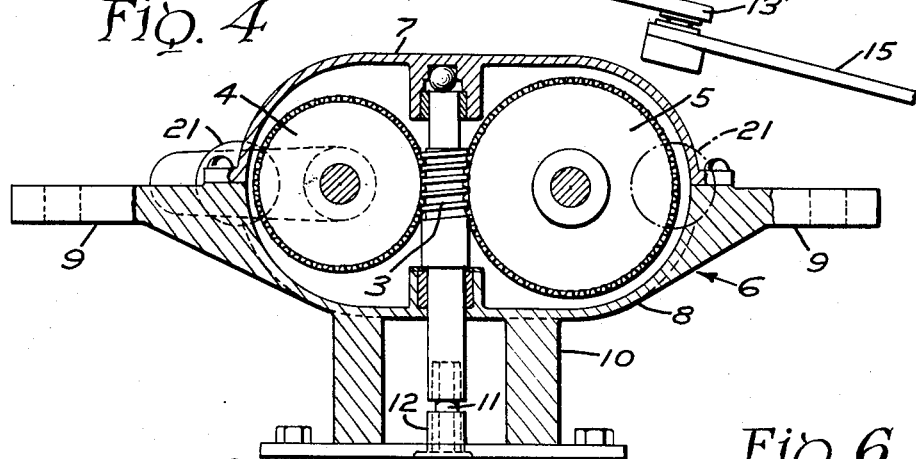
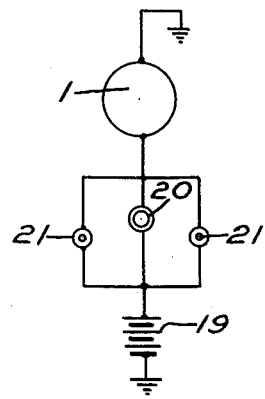
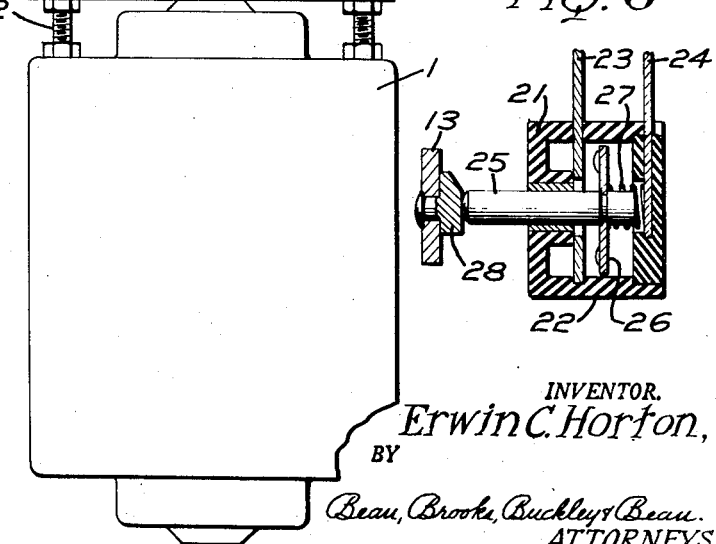
INVENTOR.
Erwin C. Horton,
BY
Beau, Brooke, Buckley & Beau.
ATTORNEYS.

Patented Oct. 19, 1954

2,691,789

UNITED STATES PATENT OFFICE 2,691,789

ELECTRIC WINDSHIELD CLEANER

Erwin C. Horton, Hamburg, N. Y., assignor to Trico Products Corporation, Buffalo, N. Y.

Application October 27, 1952, Serial No. 317,049

13 Claims. (Cl. 15—253)

This invention relates generally to the windshield cleaner art, and more especially to the electrically operated type wherein multiple wiper blades are oscillated by an electric motor. The primary object of this invention is to provide a power operated windshield cleaning mechanism, utilizing an electric motor as its source of power for actuating dual wiper blades, and including means for coordinating the speed of wiper operation so that one blade will travel at a speed faster than the other by a predetermined speed differential.

Heretofore in electrically driven dual wipers both blades have operated at the same speed, being driven by a revolving motion-translating mechanism through which the rotational motion of the electric motor, as transmitted through a worm and gear drive, has been translated by means of links extending from one or two revolving crank pins. These crank pins have been carried on a gear, or gears, meshed with the worm. In the case where two gears have been used they have always been of the same diameter so that they would revolve in synchronism with each other. In this arrangement both wipers, one located in front of the driver of the vehicle, and the other one located on the passenger side, operate in synchronism either in movements keeping one blade substantially parallel with the other, or still in synchronism but in phase opposition, so that both blades are approaching each other and then moving away from each other at the same time.

In the instant invention, and by means of a differential in the gear size, and in the number of teeth of one gear as compared to the other, the dual blades are moved with different speeds of travel in relation to each other. For example, the blade on the driver's side may be oscillated with 25% more speed than the companion blade, the blades arriving in synchronized position only on the completion of every fifth cycle in the operation of the blade on the driver's side. By reason of this fixed ratio of speeds, this will also be every fourth cycle of the blade on the passenger's side.

A further object of the instant invention is to provide a wiper mechanism that will be more quiet in its operation, and will provide a greater degree of road safety in the operation of the motor vehicle on which it is operated.

Heretofore electrically driven windshield wipers, operating in synchronism, have had a very decided tendency to lull a drowsy driver to sleep. The constant speed, continuously repetitive, rhythmical movement of both blades swinging together in front of the driver's eyes, together with the very characteristic rhythmical whining noise of the motor and transmission, contribute essentially to this result. A transmission of the kind described is working against the greatest load as each wiper blade passes across its center of travel, and the torque load on the driving motor disappears entirely as the crank pins pass through the line of center on the connecting rods. This produces a rhythmical slowing down of the motor at the time of its greater load, and a correspondingly rhythmical increase in the speed of the motor as the rotating crank pins pass through this line of center.

Since the hum produced by the motor is a noise that varies in pitch and loudness according to the speed of motor rotation, a rhythmical change in the speed of the motor is always accompanied by a corresponding rhythmical change in its noise, and this is at the same rhythmical speed as the synchronized movement of blade travel, and altogether a serious lullaby driving hazard is presented.

For the purpose of clarity in the following description and claims, the word "cycle" as referred to a blade travel is intended always to start with a movement of such blade from its parked position and to end with its movement back again to the position of its starting point. With two blades parked, each one in a position toward the center of the car, as illustrated in the series of schematic skeletonized views of Fig. 2, it will therefore be seen that for each blade the first part of a cycle is a movement away from the center, and the last part, or finish of such cycle, is the end of a return movement toward the center. From this it will be likewise understood that the expression, "position of synchronism" will always refer to their relative position and similarity of direction of travel within their cycle of motion. Obviously, two blades that are moving at different speeds can never be continuously in synchronism, and they are synchronized only at those momentary periods when they occupy the same relative position and are traveling at the same direction in their cycles. This could be when they are simultaneously at the starting point of the cycle as described above, or at any other point in movement where the faster one arrives simultaneously with the slower one at the same point in their cycle. Since the blades are normally parked in what might ordinarily be called phase opposition, and since the two cycles are started in this relative position of comparative phase opposition, it will naturally follow that all other parts of the cycles will correspondingly be in comparative phase opposition, thus the blades would actually be in an in-phase position, for instance, when both blades are at the center of their travel and moving in opposite directions, or when both blades are simultaneously at any proportionate part of their travel across from one side to the other, but traveling in opposite directions.

In the instant invention the two blades do not ordinarily pass through the center of travel at the same time, and only once in five cycles do their driving crank pins pass through the same deadcenter position at the same time. For this reason, the load on the electric motor is not rhythmically subjected to the same variations in amount, and therefore the motor speed remains relatively constant. This avoids a droning, rthythmical hum in the noise that is produced. Likewise, with the blades traveling apparently at random, and with a movement that brings them into synchronism only at occasional intervals, the entire mechanism is relieved of objectionable factors that contribute so strongly to drowsiness on the part of the driver.

The differing positions of the blades is thus utilized to take the loading off the motor, thus taking away the objectionable sound factor and at the same time varying the motion of the blade movement on the windshield to avoid uniformity and doing away with the hypnotic effect of a non-variable swing of the blades in constant rhythmic motion before the eyes.

The variation in this described method of wiping has been found to be not only a means of giving protection against drowsiness but one of relief from monotony for the wide-awake driver as well as relief from the objectionable whine of slowing down and alternately speeding up of the electric motor.

Another object of the instant invention is to provide means whereby a common mechanism for the operation of two desynchronized moving blades can be controlled for parking purposes in such a manner as to stop the driving mechanism when both blades are in proper position for parking. Heretofore electrically driven windshield wipers have been provided with automatic parking by use of a contact effective only when the control mechanism has been set for the stopping of the wiper unit, and with said contact arranged for it to be operated automatically by and with the movements of the wiper arm, or some part of its driving gear train. In the instant invention, and in order to insure that this automatic stopping will take place only when all of the wiper blades are approaching a position for parking, duplicate contacts are provided, wired in multiple or parallel with each other, each arranged for automatic actuation by the approaching of its wiper blade to its parked position. In this arrangement if only two blades are in operation, it will be seen that even if the control switch has been placed in position for parking, the mechanism will continue to operate until each of the blades finishes its cycle of operation simultaneously with the other.

The foregoing and other objects will become readily apparent from the ensuing detailed description, taken together with the accompanying drawings forming a part thereof wherein like reference numerals denote like parts throughout the various views and wherein:

Fig. 1 is a rear view of the windshield wiper mechanism of this invention installed in place on a vehicle;

Fig. 2 comprises a series of schematic or skeletonized views showing the relative position of the two wiper blades at regular intervals throughout a complete overall cycle of operation;

Fig. 3 is a plan view of the wiper driving mechanism;

Fig. 4 is a view, partly in section, taken along line IV—IV of Fig. 3;

Fig. 5 is a schematic view of a suitable electric motor energizing circuit; and

Fig. 6 is a sectional view of one of the automatic parking switches.

In the illustrated embodiment the electric motor 1 is mounted by studs 2 or the like as a separate unit on a wiper driving or power transmitting mechanism comprising a primary drive worm shaft 3 which may be rotatable at motor speed and two gears 4 and 5, one mounted off one side of the worm and the other oppositely disposed to take the axial thrust of the worm in balanced relation, both gears being mounted in a casing 6 providing a journal bearing support on each side of each gear. Preferably the casing 6 is divided horizontally to form an upper and a lower section, 7 and 8, to house the gears, the lower casing section providing a well-like enclosure in which a longlasting lubricant may be retained.

Preferably the gear casing is provided with lugs 9 for attaching it to the car body and has a lower surface 10 arranged to serve as a base for attachment of the motor so as to constitute a motor and gear assembly mountable and demountable as such. The motor is preferably made detachable by a coupling 11 between the motor shaft 12 and the driving worm 3. The gear train and linkage is readily assembled, since gear 4 has a driving lever or crank arm 13 on one side of the casing and the companion gear 5 has its lever or crank arm 13' mounted on the opposite side of the casing, each of the lever arms being movable in separate angularly displaced paths.

The gear casing may be arranged to displace the gears angularly out of parallel relation with each other, but to bring their axes, respectively, into substantial parallelism with the axes of the wiper shafts 14 to permit a more nearly straightline drive through articulated linkage 15 from the centrally located drive gear or its lever arm. Linkage 15 includes rocking members connected to the wiper shaft and links connecting said rocking members to the levers or crank arms 13 and 13'. With such driving mechanisms, if the two blades were simultaneously at mid-travel position across windshield 18, it would most heavily tax the motor and slow down the motion of the abnormally burdened motor, causing a slowing down of the wipers, followed by a gaining of the motor speed as the blades approach their end position, and this in turn would produce a louder sound of higher pitch. Due to the pitch change, some observers might call the low pitched sound louder, and some would call the high pitched sound louder, but there is definitely a rhythmical variation in the loudness as well as the pitch of the sound, and this taken together with the rhythmical motion of blades moving at substantially uniform speed and with each blade synchronized with the other has resulted in both unpleasant sound and a monotonous blade motion, which combination has had the definite tendency to lull the driver into a dangerous state of sleepiness.

It has been found that the desired relief from rhythmical monotony can be accomplished by a de-synchronous drive of the type described in which one gear 5 has 80 teeth while the other gear 4 is cut with 64 teeth. This ratio of 4 to 5 provides for the meeting of the blades in substantial angular alignment on each fifth cycle of the faster moving blade. The blades are in fact moving at all times at different speeds, the blade on the driver's side making five cycles while the opposite blade is making four cycles.

This action is illustrated by the schematic showings of Fig. 2, wherein blade 16 is on the driver's side, and blade 17 is on the passenger's side, and wherein this relative arrangement remains the same throughout the various showings which are arranged in columnar form beginning with the top left-hand view showing both blades in their initial parked position. The numbers appearing directly above the center of rotation of blade 16 indicate the number of cycles of operation of this blade.

Blade 16 is shown in one of its extreme positions in each instance, with the arrow indicating its direction of movement thereto. In the several showings where there are two arrowheads used for the blade on the passenger's side, it indicates that during this period of movement the passenger's blade has traveled from the position indicated by the broken line extending out beyond the arcuate lines indicating direction of travel down to the extreme travel in the direction of the broken arrow and then back in the direction of the solid arrow into the position shown by the solid line. This direction of travel is further indicated in the blade on the passenger's side by shaded lines which are added to the view on the side of the blade from which its travel has taken place.

Thus, starting from a position with both blades parked, blade 16 completes two and one-half cycles of operation and blade 17 completes two before they are both at an end of travel, at which time they assume parallel or 180° out of phase positions. Blade 16 must complete another two and one-half cycles and blade 17 another two cycles, making a total of five and four cycles, respectively, before said blades simultaneously reach their original synchronized position.

From the above description, it will be observed that superimposed on the various cycles of movement for the driver's blade and/or any other blade, there is another overall cyclical movement which in the case used for illustration would be five cycles of operation on the driver's blade and the four cycles of operation on the passenger's blade during the same period. When the wipers are turned on the blades start together from a synchronized parked position and run at different speeds until they both come together simultaneously again at this same parked position, which completes one cycle of the overall cyclical movement.

The effect of the de-synchronous blade travel not only renders the movement of the blades before the eyes of the driver devoid of monotonous motion, which has been found to be the most undesirable feature of tandem blades moved at uniform speed, but in addition it results in eliminating the heavy loading of the motor resulting from the simultaneous drag of two blades in a like position of maximum torque drag and causing the motor to slow and speed up with its concurrent whine.

In addition, means are provided for automatically parking the wipers when the blades reach their synchronized parking position at the conclusion of an overall cycle of operation. Thus, referring to Figs. 5 and 6, motor 1 is energized through a circuit including source 19, with appropriate grounds, and a manual control switch 20 for selective on-off control of the wipers is included in said energizing circuit for operation in a conventional manner. Also included in said motor energizing circuit are two identical automatic switches 21, which automatic switches are arranged in parallel with switch 20 and are opened automatically upon blades 16 and 17 assuming a parked position.

Switches 21 may take the form shown in Fig. 6, wherein they comprise an insulating casing 22 mounting spaced electrically conducting elements 23, 24. A push button 25 is slidably mounted in casing 22 and carries a contact plate 26, and a spring 27 extends between element 24 and plate 26 for biasing the latter into contact with element 23 to complete the motor energizing circuit through said switch. However, said switches are mounted on casing 6 in such manner that push buttons 25 are engaged by cam lugs 28 carried by crank arms 13 and 13' to open said switches and their corresponding motor energizing circuits only as the blades assume their synchronized parked position.

In operation, switch 20 is manually closed to energize motor 1, and by reason of the parallel connection of switches 20 and 21, the position of switches 21 will not affect the operation of the wipers as long as switch 20 is closed. When it is desired to stop the wiper operation and park the wipers, switch 20 is manually opened. However, energization of motor 1 will proceed through one or both of switches 21 until the blades simultaneously reach their synchronized parked position, at which time all three switches will be open and the motor will stop. Thus, the wipers stop automatically at the conclusion of an overall cycle of operation whereby the desired parking arrangement is always achieved.

Thus, it will be seen that the instant invention fully accomplishes its aforesaid objects. While a preferred embodiment has been disclosed herein, the invention is not necessarily limited thereto but encompasses modifications thereof falling within the scope of the appended claims.

Having completely disclosed this invention, and described its mode of operation, what is claimed as new is as follows:

1. In a windshield wiper mechanism including multiple wiper units driven from a single motor, separate elements in the drive transmission arranged to drive one wiper unit proportionately faster than another, said wiper units being drivingly related so that after a predetermined number of cycles of operation of one wiper unit another will have operated through a different predetermined number of cycles with said wiper units being brought into synchronized phase position upon said predetermined number of cycles of operation of the respective wiper units.

2. In a windshield wiper mechanism including multiple wipers driven from a single motor, separate elements in the drive transmission arranged to drive one wiper proportionately faster than another whereby to provide non-synchronized wiper motion, each of said wipers being drivingly related to another so that after a predetermined number of cycles on one wiper another will have operated through a different predetermined number of cycles bringing said wipers into a synchronized phase position, and selective control means for effecting continuous operation of the motor and for selectively automatically stopping the motor when said wipers assume said synchronized phase position.

3. In a windshield wiper mechanism including multiple wipers driven from a single motor, drive transmission means arranged to simultaneously drive said wipers at different relative speeds, said wipers being related to one another so that after a predetermined number of cycles of operation said wipers will reach a predetermined in-phase position, and control means for running and stopping said motor including stopping means automatically effective only when said wipers are in said in-phase position.

4. In a windshield wiper mechanism including multiple wipers driven from a single motor, power transmission means arranged to drive one wiper proportionately faster than another, said wipers being interrelated so that after a predetermined number of wiping cycles on one wiper and a different predetermined number of wiping cycles on another wiper said wipers will be momentarily brought into phase, and control means for selectively running and stopping the motor including means making the stopping means effective only when said wipers are in phase.

5. In a windshield wiper mechanism including multiple wiper units driven from a single motor, drive transmission means arranged to drive said wiper units at different relative speeds, said wiper units being related to each other so that after a predetermined number of cycles of operation said wiper units will assume a predetermined relative position, and control means for running and stopping the motor including multiple switch means opened automatically responsive to movements of said wiper units as they assume said predetermined relative position, said switch means being arranged in parallel with each other so that they must be open simultaneously in order to effect stopping of the motor.

6. In a windshield wiper mechanism a rotary motor, spaced wipers each carried by a pivot shaft, a gear train including a speed reducing worm connected to said motor and two gears of differing diameter engaging said worm, each of said gears having a shaft, and lever means interconnecting said gear shafts and said pivot shafts for converting the rotational motion of said gears into a reciprocal motion to oscillate said pivot shafts, whereby said gears will move said wipers.

7. In a transmission mechanism for a windshield wiper including a pair of pivot shafts mounting at one end a pair of wipers on a windshield, said shafts each having a rocking member fixed on its opposite end, a connecting link attached adjacent one end to each of said rocking members, drive gears, and levers driven by said gears and connected to the opposite end of each of said connecting links, said drive gears differing in diameter to provide variable speed of travel of the wipers to swing said wipers in non-synchronized movement across respective areas of the windshield to clear the same of moisture.

8. In a windshield wiper mechanism including a rotary motor and paired wiper blades carried on pivotally mounted wiper arms, gearing arranged to receive the turning torque of said motor for transmission of motion to said blades for conjoined oscillation of said blades on a windshield, said gearing including means for swinging said blades in non-synchronized motion across substantially equal lengths of arcuate travel with one of said blades moving faster than the other.

9. In a windshield wiper mechanism comprising two or more wiper units driven from a single source of power, transmission means for driving one wiper unit faster than another at a predetermined speed differential, said wiper units coming into synchronized phase position at the end of a predetermined number of different cycles of operation of the respective wiper units to provide an overall cyclical movement, and control means including means for automatically interrupting the source of power to stop the mechanism only at the end of such an overall cycle of movement.

10. An electric windshield wiper mechanism comprising an electric motor, multiple wiper units, transmission means drivingly connecting said wiper units to said motor, said transmission means being arranged to drive said wiper units at different relative speeds with said wiper units assuming a synchronized parking position at the end of an overall wiping cycle comprising a predetermined number of wiping cycles on one wiper unit and a different predetermined number of wiping cycles on the other wiper unit, and selective control means therefor including means for automatically stopping and parking said wiper units only when they assume said synchronized parking position.

11. A windshield cleaner comprising a pair of spaced wipers, a rotating drive common to both wipers for oscillating the same, and a transmission connecting the drive to the wipers, said transmission including two rotatable members, one for each wiper connected thereto for oscillating it through wiping cycles between two terminal positions, said rotatable members having their peripheries interconnected to maintain like peripheral speed, the periphery of one member being of greater extent than that of the other member to oscillate the two wipers from one of their terminal positions with a constantly changing out-of-phase action for a predetermined number of cycles of one wiper before restoring the wipers again to a terminal position in phase concurrence.

12. A windshield cleaner comprising a pair of spaced wipers, a rotating drive common to both wipers for oscillating the same, and a transmission connecting the drive to the wipers, said transmission including two gears, one for each wiper connected thereto for oscillating it through wiping cycles between two terminal positions, said gears having their teeth in intermeshed relation to maintain like peripheral speed, the number of teeth on one gear being greater than the number of teeth on the other gear to oscillate the two wipers at different speeds from an in-phase relation at one of their terminal positions and for a predetermined number of cycles of one wiper before restoring the wipers again to a terminal position in phase concurrence.

13. An electric windshield cleaner system comprising, a pair of oscillatory wipers, electrically powered means operable to oscillate the two wipers through different wiping cycles starting from an in-phase parked terminal position with a progressively varying out-of-phase relation to return again to an in-phase relation at said terminal position, an energizing electric circuit including said electrically powered means, a pair of switches arranged in parallel in the circuit to necessitate the opening of both switches to interrupt said circuit and one switch being associated with each wiper, means operable in timed relation with and by each wiper to open its respective switch when such wiper is in said terminal position, and a manually operable switch arranged in a shunting circuit about said pair of switches to start operation of the cleaner system and to preset the windshield cleaner system for parking the two wipers.

References Cited in the file of this patent

UNITED STATES PATENTS

| Number | Name | Date |
|---|---|---|
| 2,258,010 | Horton et al. | Oct. 7, 1941 |
| 2,270,589 | Hanson | Jan. 20, 1942 |